United States Patent [19]

Nobileau et al.

[11] 4,302,652

[45] Nov. 24, 1981

[54] METHOD OF WELDING THE ENDS OF SUBMERGED PIPES BY SLEEVE ABUTMENT

[75] Inventors: Philippe C. Nobileau, Neuilly sur Seine; Rene M. Dermy, Courcouronnes; Guy J. Fleury, Paris, all of France

[73] Assignees: Compagnie Francaise des Petroles; Etudes Petrolieres Marines, both of Paris; Ateliers et Chantiers de Bretagne - A.C.B., Nantes; Compagnie Maritime d'Expertises, Marseilles; Compagnie Generale pour les Developpements Operationnels des Richesses Sous-Marines (Doris), Paris; Societe Nationale Elf Aquitaine (Production), Courbevoie, all of France

[21] Appl. No.: 46,128

[22] Filed: Jun. 6, 1979

Related U.S. Application Data

[62] Division of Ser. No. 706,324, Jul. 19, 1976, Pat. No. 4,171,175.

[30] Foreign Application Priority Data

Jul. 28, 1975 [FR] France .............................. 75 23429

[51] Int. Cl.³ .............................................. B23K 9/16
[52] U.S. Cl. ...................................... 219/72; 219/61; 219/137 R; 405/170; 405/189
[58] Field of Search ................. 405/170, 189; 219/72, 219/61, 137 R

[56] References Cited

U.S. PATENT DOCUMENTS 3,339,011  8/1967  Ewors .
3,407,611  10/1968  Coultroup .......................... 405/170
3,795,115  3/1974  Berquist .............................. 405/170

FOREIGN PATENT DOCUMENTS

20623  11/1956  Fed. Rep. of Germany ........ 219/61

Primary Examiner—Elliot A. Goldberg
Attorney, Agent, or Firm—Sughrue, Mion, Zinn, Macpeak and Seas

[57] ABSTRACT

A method of welding the ends of submerged pipes in a gaseous atmosphere at any depth comprises isolating the ends of the pipes by introducing obturators therein and then introducing the pipe ends into an open topped receptacle which is capped with an underwater personal carrying intervention unit. The closed receptacle is filled with gas and then a sleeve is positioned between the ends of the pipes and welded to the pipes.

17 Claims, 17 Drawing Figures

METHOD OF WELDING THE ENDS OF SUBMERGED PIPES BY SLEEVE ABUTMENT

This is a division of application Ser. No. 706,324, filed July 19, 1976 now U.S. Pat. No. 4,171,175 issued Oct. 16, 1979.

The invention relates to the joining of the ends of two submerged pipes particularly but not exclusively in deep water, welding of the ends being carried out in a gaseous environment.

The need to carry out welding out of contact with water and at depths beyond the range of divers has led to the search for a deep water joining method using reliable devices, assuring perfect safety for any intervention crew.

It is a principal object of the invention to provide a method of joining together the ends of two submerged pipes by welding in a gaseous atmosphere, comprising isolating said ends of said pipes to be joined by means of obturators placed beforehand in each said pipe end, introducing said pipe ends into a receptacle, closing said receptacle by means of an intervention unit, filling said closed receptacle with gas, and welding the thus isolated end of said pipes to a sleeve of the same diameter as said pipes.

The receptacle may be provided with two opposed openings each of which is surrounded by controllable sealing means for sealing against the pipes. End sections of the pipes are first cut off so that the distance between the pipe ends is equal to the length of the sleeve and each conduit may then be fitted with the obturator. Each end is next introduced into the corresponding opening in said receptacle, and said receptacle is rendered watertight by coupling to the underwater intervention unit and by operating said sealing means. In the special case where the conduits are submerged from the surface and contain no water, for example when the conduits are being laid by means of two vessels travelling towards one another, it may be sufficient to first fit the ends to be joined with obturators on the surface, placing them at a sufficient distance from the ends to be out of range of the cutters, and to proceed as above but removing the obturators, if the conduits are at atmospheric pressure, before welding of the sleeve.

To increase the safety for the intervention crew, whether the conduits are filled with water or pressurized air and whether the obturators are fitted on the surface or underwater, each obturator may include a cylinder with its piston rod directed towards the other conduit so that in the advanced positions the piston rods bear against one another to hold the obturators apart, whatever the pressure difference across the opposed faces of the obturators.

Under these circumstances to facilitate positioning of the sleeve, the faces of the obturators directed towards one another may be provided with support means for the location of detachable booms which are used during the introduction of the sleeve between the conduits, so that there is always at least one boom replacing the support provided by the piston rods of the cylinders when the latter are temporarily retracted during the passage of the lower wall of the sleeve passed the axis of the obturators.

To facilitate centering of the obturators relative to the centre of the receptacle, a removable centering device may be provided in the receptacle such that, when the piston rods of the cylinders are advanced, it is sufficient to cap the receptacle with the underwater intervention unit and depressurize the receptacle to make the obturators slide until their piston rods bear on one another at the centre of the receptacle.

The obturators can then be sealed against the walls of the pipes, atmospheric pressure established, if this has not been done already, and the centering device withdrawn by the intervention crew. The cutting off of end sections of the pipes determines the distance between the pipes in the receptacle and the length of the sleeve, and it will be seen that it is easy to butt join the sleeve to the pipe ends and attach it by welding. The obturators can finally be removed by retracting the piston rods of the cylinders, releasing sealing means on the obturators from the inner surfaces of the walls of the pipes, followed by increasing the pressure in one of the pipes.

It is another object of the invention to provide apparatus for carrying out the above method, the apparatus comprising a receptacle having a wall defining two openings each for receiving a pipe end and surrounded by an external sealing means for sealing against the pipe end, and with an opening for communication with an intervention unit. Sealing means are provided for isolating the receptacle from the medium contained in the pipes and for insertion in the pipes before the pipes are introduced into said receptacle. The sealing means are provided on obturators comprising at least one control for the sealing means thereof accessible from the exterior of said pipes.

The receptacle may comprise a removable device for centering the obturators introduced into the conduits relative to said receptacle.

The external sealing means may comprise lip seals which can be raised by inflation of a chamber in part defined by the lip seal so that after the pipes have been introduced into the receptacle, it is sufficient to deflate the seals to bring about the application of the lips to the outside surfaces of the conduits by hydrostatic pressure.

The obturators may comprise sealing means which can be controlled to apply the seals against the pipe walls and to remove such application to enable movement of the obturators in the pipes.

The obturators may include means enabling their extraction from the pipes. The obturators may comprise safety means for maintaining the obturators in position before welding of the sleeve to the two pipes.

It is thus possible to carry out welding protected from the water and in complete safety whatever the depth, whether the pipes are to be repaired after submersion or to be joined during the laying thereof from two vessels moving towards one another and submerging them on site with or without obturators, the pipes thus being filled with air or with water. The butt joining of a sleeve of the same diameter and thickness as the pipes also avoids risk of accidental deposits due to the uniformity of the inside walls of the pipes after jointing.

The invention will be more fully understood from the following description of an embodiment thereof, given by way of example only, with reference to the accompanying drawings.

Figure 1:
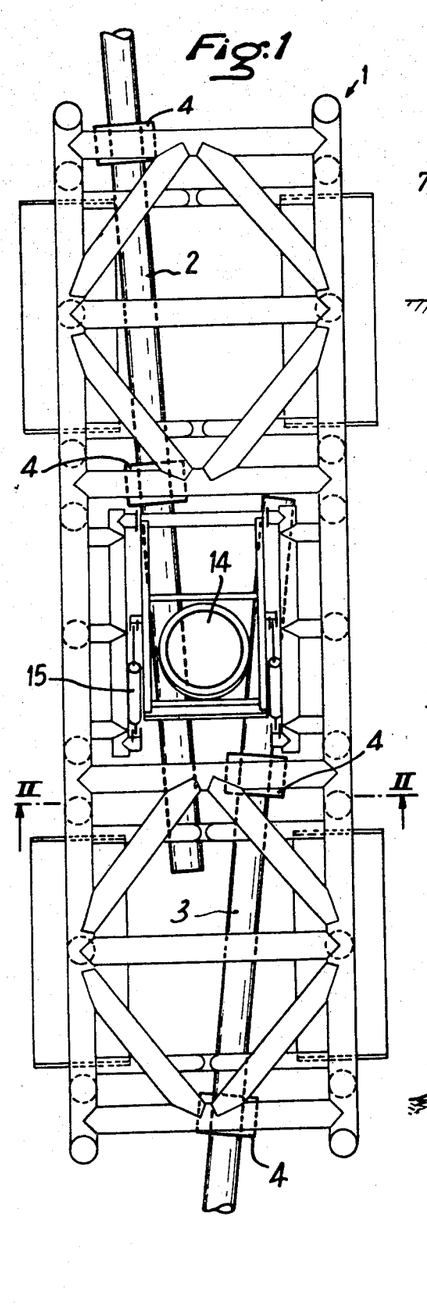
FIG. 1 is a plan view of a structure for handling the pipes to be joined and including a receptacle according to the invention.
Figure 2:
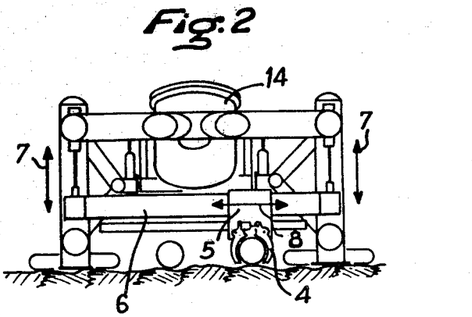
FIG. 2 is a section on the line II—II in FIG. 1.
Figure 10:
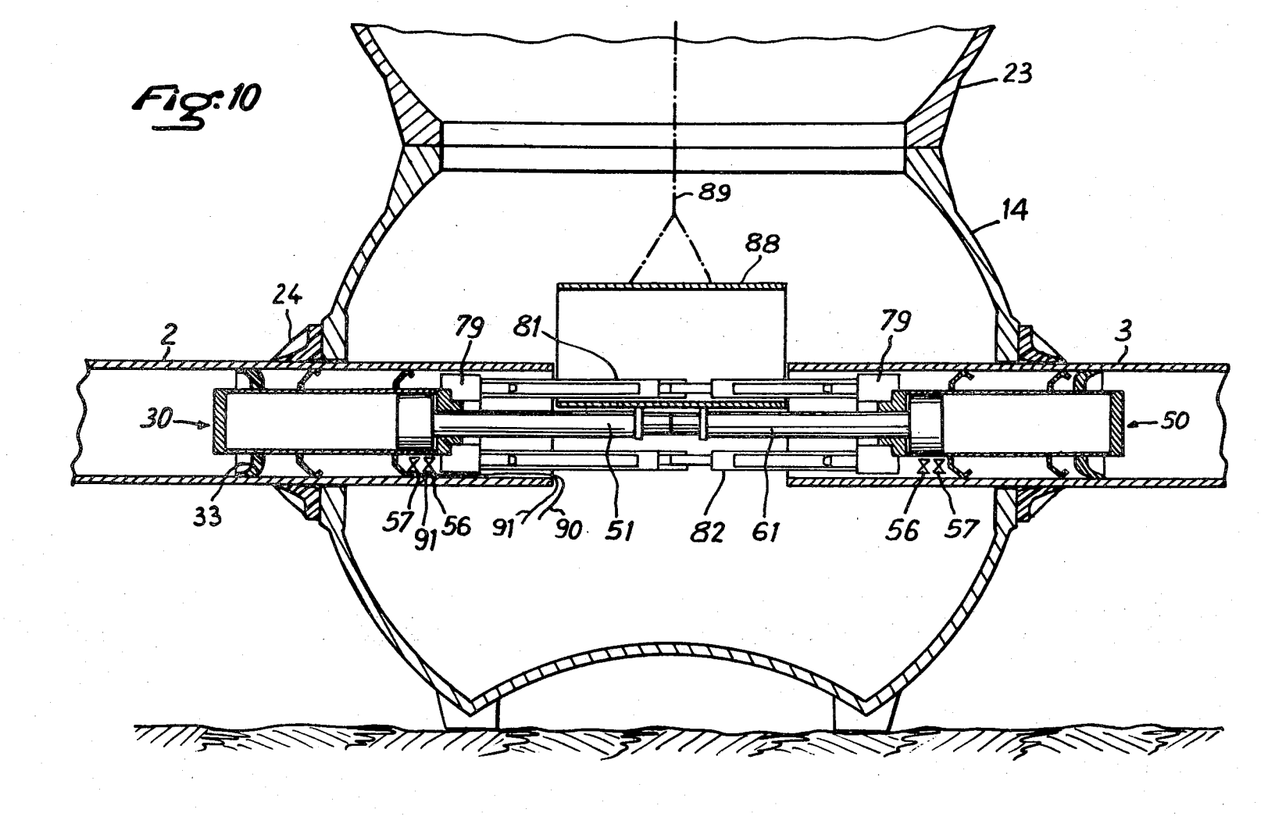
FIG. 10 is a schematic section through the receptacle during introduction of a sleeve to be welded to the pipes.

As shown in the drawings, the structure 1 is composed of conventional units for handling pipes such as pipes 2 and 3, and has been shown only to illustrate the method of welding submerged pipes. It can be replaced by any handling structure comprising tongs such as tongs 4 mounted on movable supports 5 and 6, the function of which is to engage pipes for the purpose of lifting them, as shown schematically in FIG. 2 by the arrows 7, and moving them sideways as shown by the arrows 8. In this way the pipes 2 and 3 can be made parallel and brought into positions facing circular cutters 9 and 10 which are operable to cut end sections 12, 13 from the pipes so as to open the ends of the pipes by a predetermined distance equal to the length of a joining sleeve 88 (FIG. 10). Tongs 11 enable pipe sections 12 and 13 to be removed after they are cut off.

Figure 4:
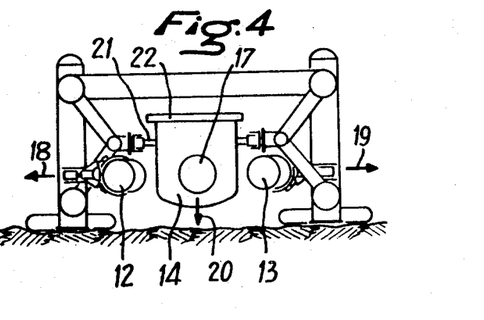
FIG. 4 is a side view of the structure showing the receptacle in the position for receiving the conduits.
Figure 5:
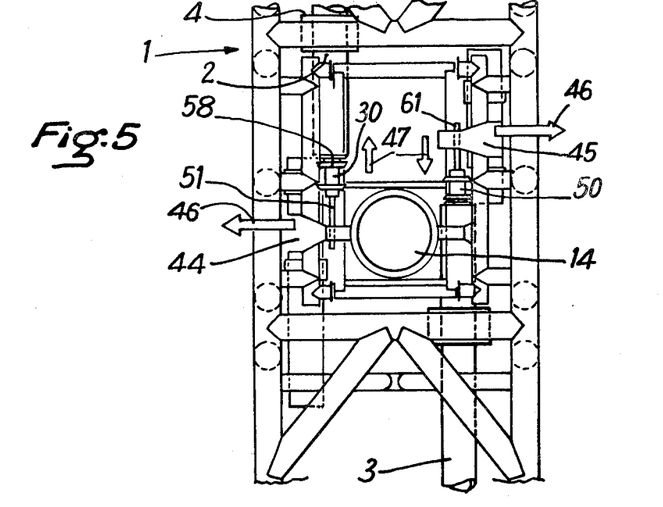
FIG. 5 is a schematic representation of the structure during the fitting of the obturators in the pipes.

The structure 1, called a liner, supports a receptacle 14 which is movable by cylinders 15. After the sections 12 and 13 have been cut off, the receptacle 14 takes up the position shown in FIG. 4. In this position the pipes 2 and 3 are situated at the same level as diametrically opposed openings 16 and 17 in the receptacle wall, which are more clearly seen in FIG. 5. The arrows 18 and 19, FIG. 4, show the movement of the cut off pipe sections 12 and 13, and the arrow 20 shows the downward movement of the receptacle 14. In the embodiment shown, the receptacle 14 is pivotable on shafts 21. It has an upper opening surrounded by a rim 22 which, in the position shown, can receive a suitable underwater intervention unit 23.

Figure 8:
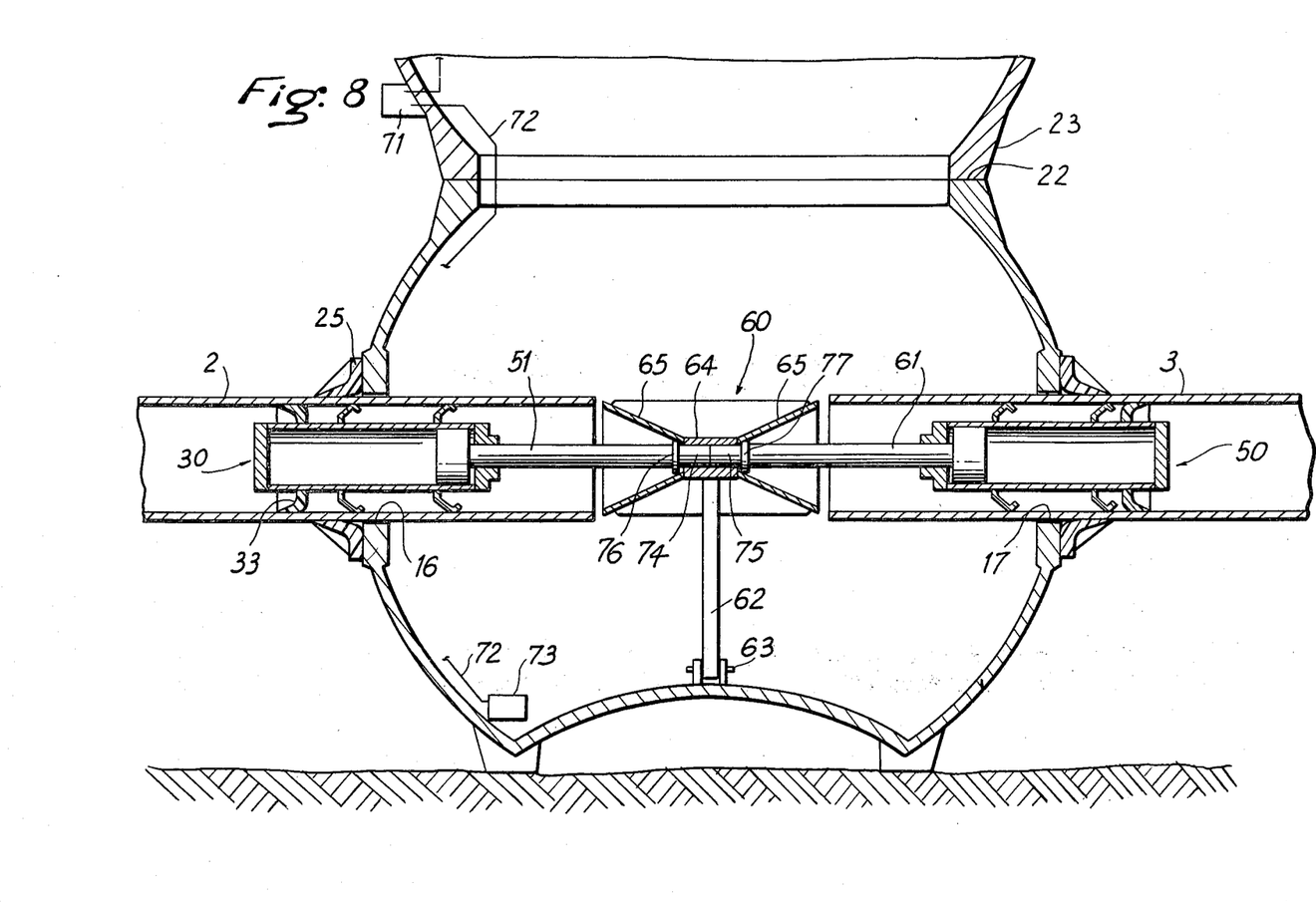
FIG. 8 is a schematic section through the receptacle and part of an underwater intervention unit after centering of the obturators.

As such intervention units are already known, FIG. 8 only shows the lower part of an intervention unit 23 resting on the docking rim 22 of the receptacle 14.

Figure 6:
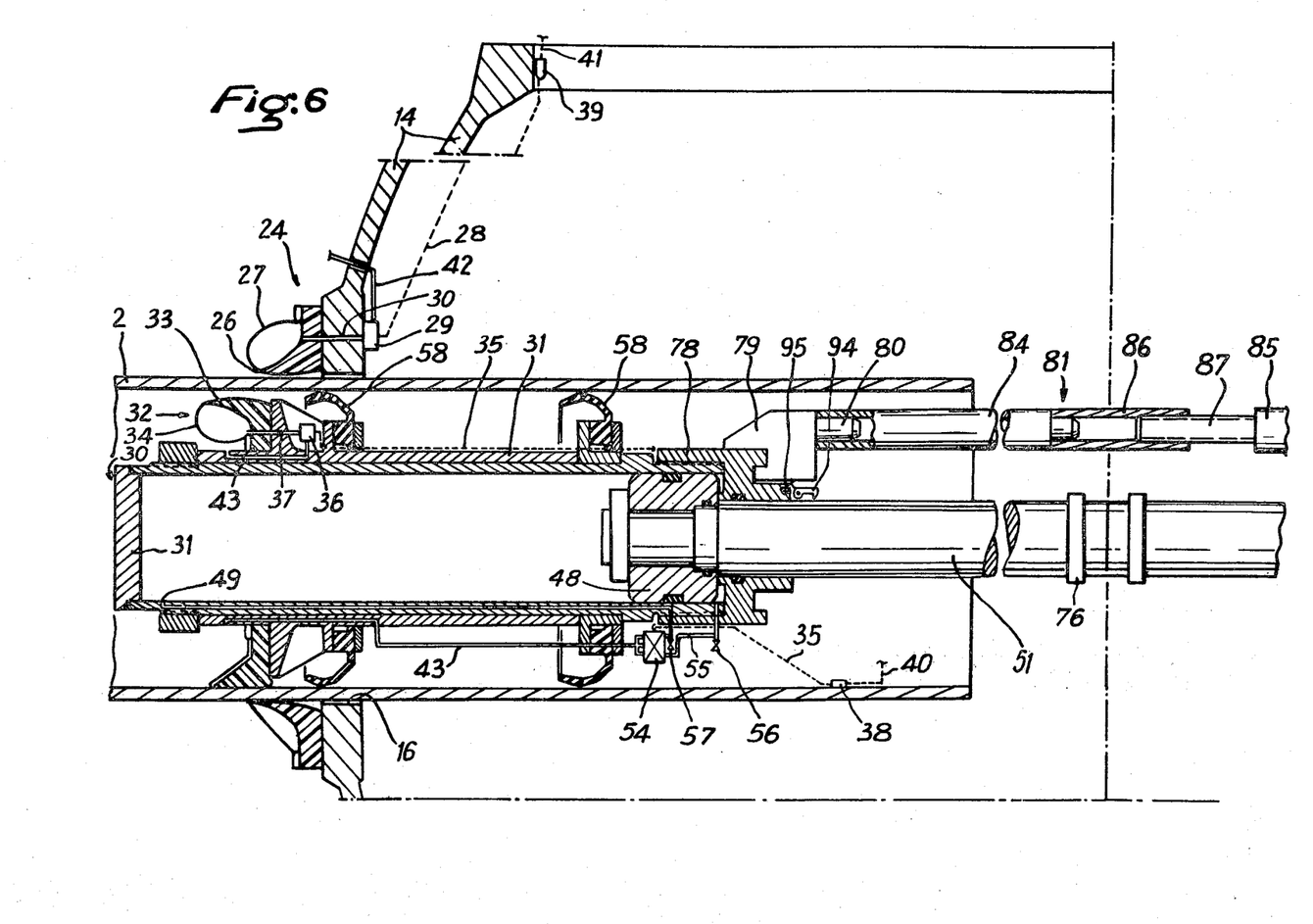
FIG. 6 is a schematic section through part of the receptacle and an obturator in one end of one pipe.

Each opening 16 and 17 is provided with sealing means 24, FIG. 6, consisting for example of a lip seal 25, for example as described in U.S. Pat. No. 4,045,035. The end 26 of the lip is fast with a membrane 27 which defines a chamber with the lip seal which can be inflated via a pipe 42 passing through the lip seal and connected through an electromagnetic valve 29 to a pipe 30 which, in the embodiment shown, passes through the wall of the receptacle 14. In the inflated condition of the sealing means 24, the pipe 2 can be introduced into the opening 16.

Obturators 30 and 50 which are introduced into the ends of respective pipes 2 and 3 each comprise a cylinder body 31 the outside of which supports internal sealing means 32 which can be of the same type as the external sealing means 24. In this example, means 32 comprises a lip seal 33 (FIG. 6) fast with a membrane 34 which together define a chamber which can be inflated via, for example, a pipe 43 connected through an electromagnetic valve 36 to a pipe 37. As shown in FIG. 6, the sealing means 32 is inflated.

In order to clarify the drawing, only two connectors 38 and 39 are shown connected to conductors 40 and 41 in turn connected to a source which is not shown and supplying the electromagnetic valves 36 and 29 via circuits 35 and 28 respectively.

If the pipes 2 and 3 are already submerged, the obturators can be introduced after cutting off the sections 12 and 13, by means of the liner 1. This operation is shown schematically in FIG. 5. Carriages 44 and 45 are movable laterally, as shown by the arrows 46, and longitudinally, as shown by the arrows 47, to move the obturators 30 and 50 into alignment with the pipes 2 and 3, respectively, and then introduce the obturators into the pipes 2 and 3 by a predetermined distance. As the carriages 44 and 45 and the control means therefor are of any suitable conventional type, they will not be described in detail. As shown, the obturators 30 and 50 are supported from the carriages by the rods 51 and 61 of the cylinders.

A piston 48 which controls movement of the piston rod 51, FIG. 6, is pushed into the position shown by control fluid which is introduced into the cylinder 31 via a pipe 49 connected to a supply pipe 43 through an electromagnetic valve 54. Return of the piston rod 51 to the retracted position is controlled by the electromagnetic valve 54 and a pipe 55. Valves 56 and 57 are provided on each of the pipes 55 and 49, and can be used for manoeuvring the piston. The electromagnetic valve 54 will not be described as it is a conventional multi-way electromagnetic valve. Likewise, the device for controlling the electromagnetic valve can be of any suitable type, as will be shown below.

The stability of the obturator in the pipe 2 is maintained, during removal of the positioning carriage 44, by rings 58, and sealing of the obturator is initiated by operation of the electromagnetic valve 36. To this end, the carriage 44 disconnects the connection 40 as it returns to its initial position to cut off the current supplying the electromagnetic valve 36 through the connector 38. The electromagnetic valve 36 is therefore no longer energized and moves to free the passage between the pipes 37 and 43. As the membrane 34 is no longer under pressure, it relaxes, releasing the lip 33 which contacts the inner wall of the pipe.

Figure 3:
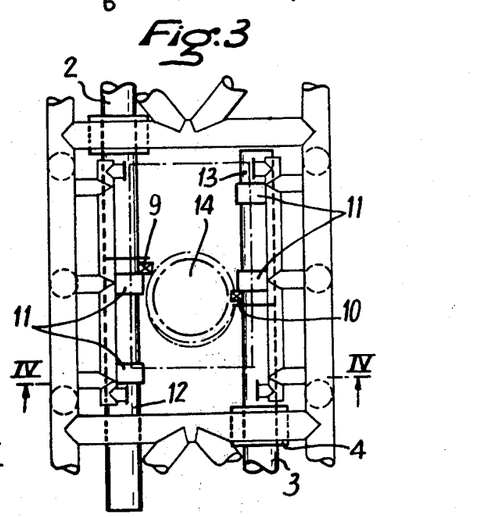
FIG. 3 is a partial view of the structure after the pipes have been made parallel to one another.

In the case under consideration, in which the pipes 2 and 3, FIG. 1, are already submerged, the liner 1 brings the pipes into the position shown in FIG. 6 with the aid of tongs 4, cuts off the end sections 12 and 13 with the aid of circular cutters 9 and 10, removes the cut off sections with the aid of tongs 11, and introduces the obturators 30 and 50 into the pipes 2 and 3, FIG. 3. The receptacle 14 is positioned so that its openings 16 and 17 are at the same level as the ends of the conduits 2 and 3.

The liner then moves the pipe 2 sideways with the aid of the tongs 4 to bring it on to the axis of the opening 16, and then moves the receptacle 14 towards the pipe 2 so that the latter slides freely into the opening 16 to the position shown in the upper part of FIG. 6. The sealing means 24, inflated while the pipe is inserted into the opening, are then operated. To this end, the connector 39 controlling the electromagnetic valve 29 is disconnected from the unit 23 to deenergize the valve 29. This allows communication between pipes 30 and 42 so that the lip seal 26 relaxes to rest on the outer surface of the pipe 2 as shown in the lower part of FIG. 6.

Figure 7:
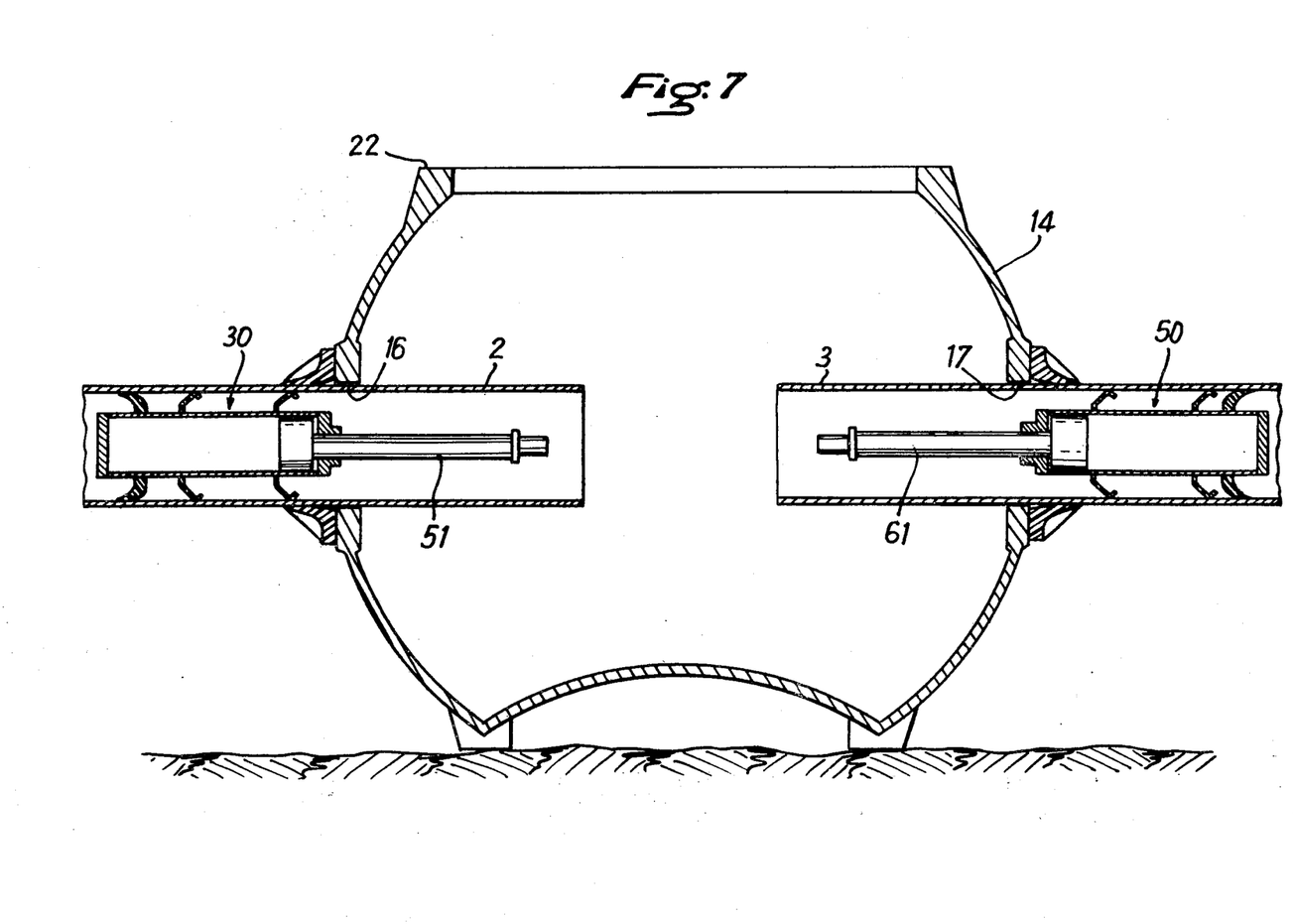
FIG. 7 is a schematic section through the receptacle after the introduction of the pipes.
Figure 9:
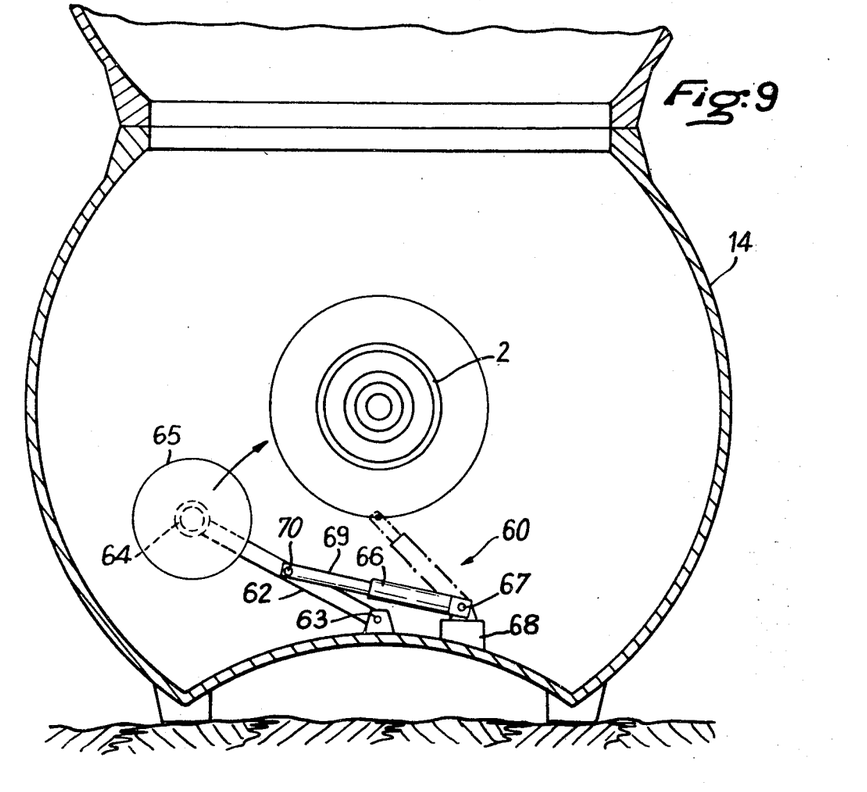
FIG. 9 is the schematic view of the centering device shown in FIG. 8 in a cross-section through the receptacle.

The liner then brings the pipe 3 with its obturator 50 on to the axis of the opening 17 and moves the receptacle 14 towards the pipe 3 so that the pipes and the receptacle take up the positions shown in FIG. 7, the sealing means 32 being operated as described above. The receptacle may also comprise a centering device 60, FIGS. 8 and 9, which can be controlled from the underwater intervention unit 23, when it has been lowered on to the receptacle 14. This device 60 comprises a support 62 which is articulated at its lower end 63 and carries at its upper end an assembly consisting of a cylindrical structure 64 and two part-conical members 65. A cylinder 66 pivoted at 67 to a support 68 and with its piston rod 69 pivoted at 70 to the support 62, controls the inclination of the device 60. When the cylinder 66 has been operated so as to locate the structure 64 in the centre of the receptacle 14, the enclosure formed by the receptacle 14 and the intervention unit 23 is depressurized by operating a pump 71 connected to a strainer 73 by a pipe 72. The intervention unit may be of any suitable type and fitted with any desired equipment such as a control panel, a handling winch, and a safety airlock.

As the pressure in the enclosure 14–23 fails, the obturators are urged towards the centre of the receptacle and slide inside the pipes 2 and 3 until the ends 74 and 75 of the piston rods enter the cylindrical structure 64 and stop when flanges 76 and 77 bear on the ends of the cylindrical structure 64. When this condition is fulfilled, the ends 74 and 75 are in contact, and the final stages of bringing the enclosure 14–23 to atmospheric pressure applies the lips 33 and 25 to the pipes 2 and 3 ensuring sealing of the assembly of the pipes 2 and 3 and receptacle 14.

The crew of the intervention unit can then gain access to the receptacle 14 and dismantle the device 60 to allow a linking sleeve to be introduced and the piston rods 51 and 61, keeping the obturators in position whatever the pressure conditions in the pipes 2, 3 to be reinforced by an assembly of booms, for example three, which are mounted parallel to the piston rods 51, 61, as shown in FIGS. 10 to 13.

To this end, as shown in FIG. 6, on the end 78 of each obturator there are mounted three supports 79 having the same profile as the end 78 which guides the piston rod 51, the projecting parts of each of these components engaging in the grooves of the other. Each support 79 has a guide and assembly finger 80 over which is placed the end of a variable length boom 81, 82 or 83. Each boom is formed of two tubes 84 and 85, the end 86 of the tube 84 being provided with an internal thread receiving a corresponding external thread on the male end 87 of the tube 85. It is thus only necessary to turn one of the tubes to adjust the length of each boom.

Figure 11:
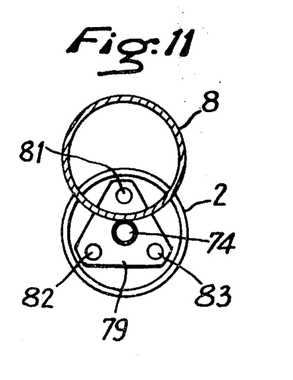
FIGS. 11 to 13 are schematic views showing the steps in the positioning of the sleeve on the axis of the pipes.
Figure 12:
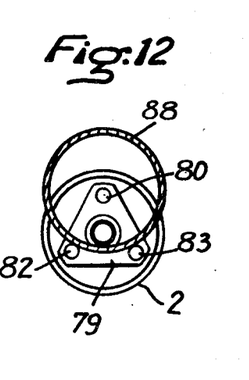
Figure 13:
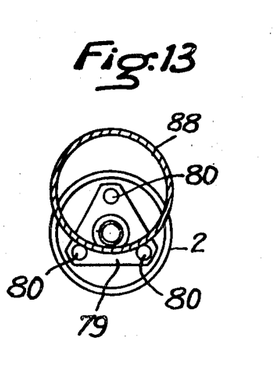

When the booms 82 and 83 have been mounted, FIG. 11, a joining sleeve 88 can be introduced with the aid of cables shown diagrammatically at 89 (FIG. 10) supported by a handling winch of the intervention unit 23. When the bottom of the sleeve 88 is just above the piston rods 51 and 61, the boom 81 is fitted, FIGS. 10 and 11, and the piston rods 51 and 61 are retracted by introducing control fluid from the hydraulic supply of the intervention unit 23, the valves 56 and 57 being for preference controlled from the control desk of this unit. Thus at the same time as the booms are mounted, the valves 56 and 57 are connected to flexible pipes 90 and 91 connected to the hydraulic supply of the unit 23. After further lowering of the sleeve 88, the piston rods 51 and 61 are advanced by operation of the valves 57, so that the obturators are retained by their rods, as shown in FIG. 12, and the booms 82 and 83 and the flexible pipes 90 and 91 used for controlling the retracting and advancing of the rods 51 and 61 are removed. FIG. 13 shows the sleeve 88 before it is definitively positioned in alignment with the pipes 2 and 3 for the purpose of welding.

The sleeve can then be welded to the ends of the pipes 2 and 3 and the welding checked by any suitable method.

Figure 14:
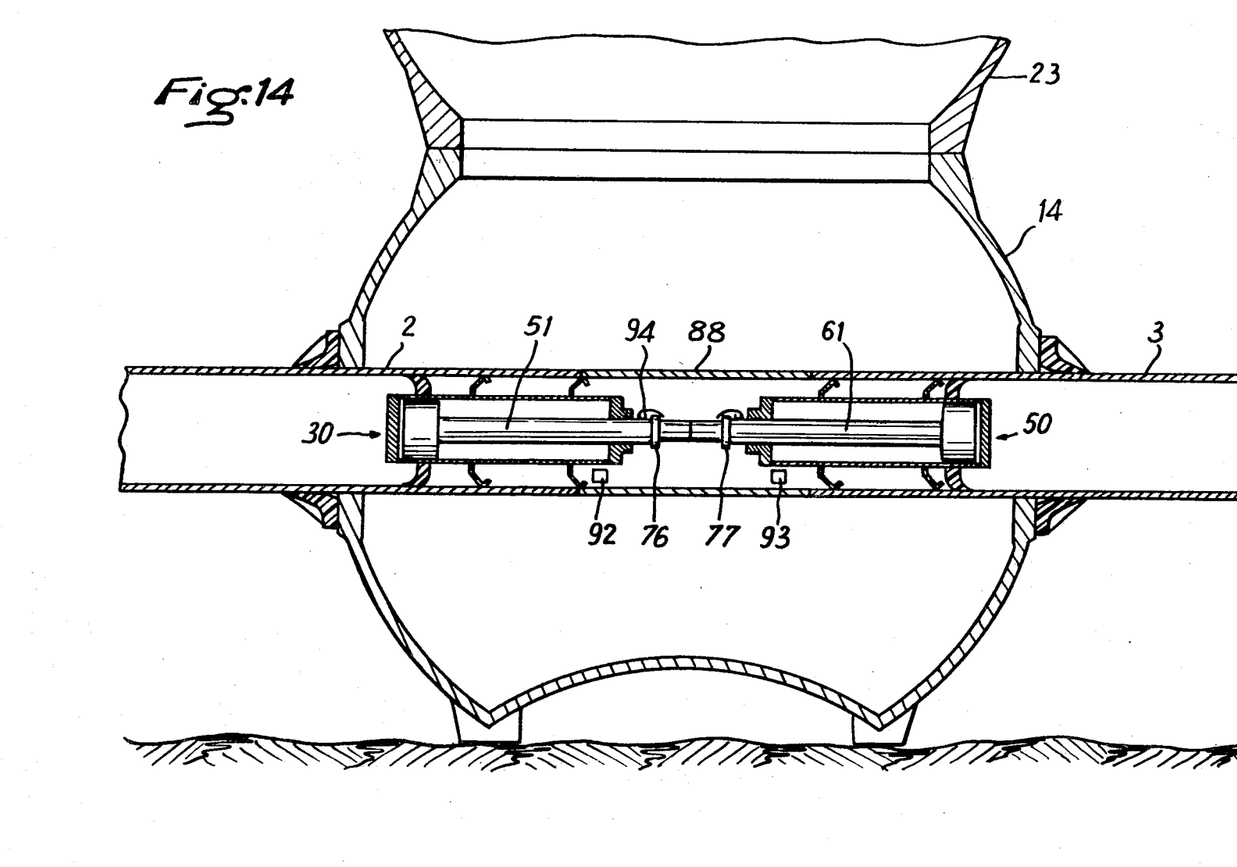
FIG. 14 is a schematic section through the receptacle after welding of the pipes.

So as not to overload FIG. 10, FIG. 14 shows symbolically means 92 and 93 for receiving control signals for the electromagnetic valves 54 which enable the piston rods 51 and 61 of the obturators 30 and 50 to be retracted after welding the sleeve. These devices will not be described as they are well known and can be of any type. The only necessary feature of these devices is that they must be receptive to any selected telecontrol means which transmits through the conduit walls. These means could, for example, be a particular isotope source of gamma radiation, the devices 92 and 93 then comprising Geiger counters which trigger electric circuits controlling the electromagnetic valves 54 after a predetermined radiation time, in order to trigger retraction of the piston rods 51 and 61. It is obvious that the telecontrol means could be coded acoustical signals, the receivers 92 and 93 then being provided with means responsive to the selected code.

Figure 15:
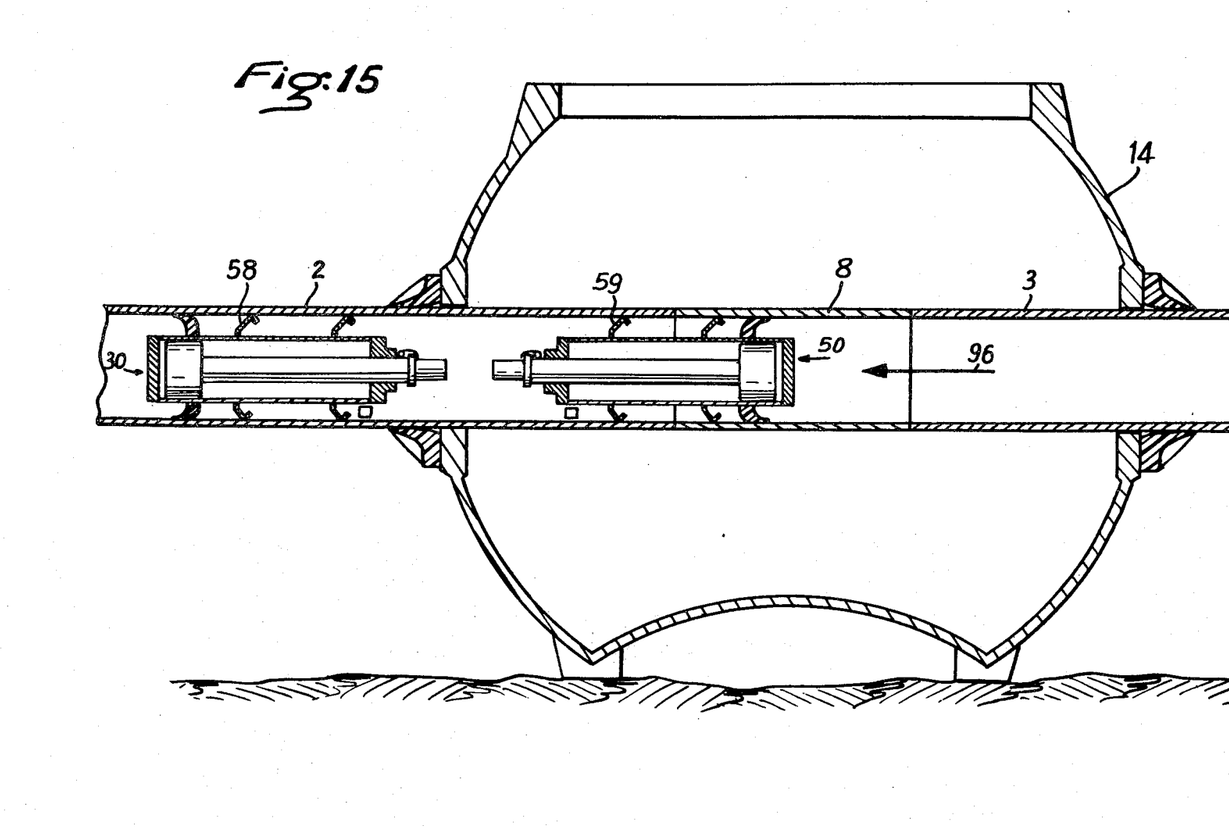
FIG. 15 is a schematic section through the receptacle after raising of the intervention unit and during removal of the obturators.

Retraction of the piston rods 51 and 61 is obtained in each cylinder by putting its chambers in communication with one another, and causes the obturators to slide towards one another, the piston rods being locked by bolts 94 (FIG. 6) pivoting on the ends 78 of the obturators which hook over the flanges 76 and 77 on the piston rods 51 and 61. Locking of the rods on withdrawing the rods to permit the sleeve 88 to pass is prevented by providing for example a blocking pin 95 which can be fastened to the support 79 or mounted on the end 78, the pin 95 only withdrawing when the support 79 is retracted. Finally, the intervention unit is raised to the surface. Pressurizing pipe 3 is enough to drive the obturators 30 and 50 in the direction of the arrow 96, FIG. 15. To this end, the rings 58 and 59 of the two obturators are both mounted so that their concave sides face the arrow 96.

The above method and apparatus have been described on the assumption that the pipes were already submerged. When they are at the surface, and especially when the pipes are to be joined in the course of laying them from two vessels moving towards one another, the obturators 30 and 50 can be inserted in the pipes at the surface, it merely being required that they are inserted to a distance sufficient to avoid any damage when the pipe sections 12 and 13 are cut off.

Figure 16:
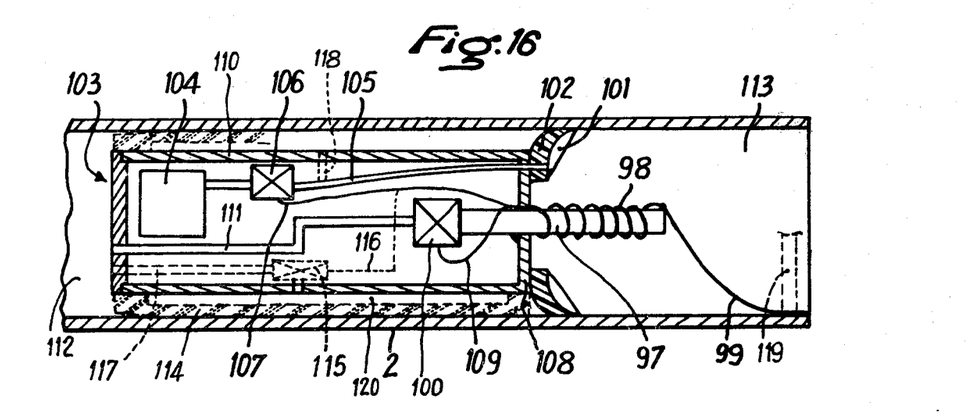
FIG. 16 is a schematic view of the end of a pipe provided with a modified form of obturator and before it is introduced into the receptacle.

As the obturators can be of any type, use can also be made of obturators, such as that shown in FIG. 16, comprising only a simple lip seal 102 mounted on a plate 108 and which can be moved out of contact with the wall of the conduit 2 by inflating a chamber defined between the seal and a membrane 101 which deforms the lip 102. There is therefore added to the obturator 103 a reservoir 104 of compressed air connected to a pipe 105 via an electromagnetic valve 106. The electromagnetic valve 106 is controlled by a circuit 107 connected to a control cable 98 which is wound on to a tube 97 to facilitate handling it. This tube provides communication between the media on either side of the watertight wall consisting of the plate 108 carrying the lip seal 102 and can be closed by operation of an electromagnetic valve 100 by an electric circuit 109 terminating at the general control cable 98. In the embodiment shown, the plate 108 forms one wall of a hermetic casing 110 pierced by a pipe 111 which can communicate with the tube 97 through the electromagnetic valve 100. A simple rope 99 facilitates taking up the cable 98 after the introduction of the pipes 2 and 3 into the receptacle as has been described. The end of the rope 99 is shown on the end of the conduit 2 after the cutting operation. In fact, the obturator 103 can alternatively be connected, through the tube 97, for example, to a retaining cable fixed to any form of detachable attachment device, shown symbolically by the rectangle 119 to avoid overloading the drawing. As soon as the ends of the conduits are inroduced into the receptacle, the situation is as shown in FIG. 7, the only exception being that only the receptacle, and the portion 113 of each pipe, is filled with water, the portions 112 being at a pressure near atmospheric. After capping the receptacle 14 with the intervention unit 23, the water is replaced with air at atmospheric pressure and the crew of the unit 23 can easily get access to the cables 98 carrying the conductors controlling the electromagnetic valves 100 and 106, with the aid of ropes 99. Each cable 98 is preferably armoured so as to facilitate removal of the obturators. To this end, after connecting the cable 98 to the control device of the unit 23, the control desk, for example, the electromagnetic valve 100 is operated to provide communication between the enclosure 14–23 and the portion 112 of the pipe 2. The same is done for the pipe 3. It is then only necessary to inflate the chambers defined by the membranes 101 by operating the electromagnetic valves 106 by means of the circuits 107 to release the lips 102 from the walls of the pipes 2 and 3 to make it possible to remove the obturators 103 by simply pulling on the cables 98. The sleeve 88 is then lowered into position between the pipe ends, welding is carried out, and the intervention unit raised.

It goes without saying that the details of the method and the apparatus described above can be modified, added to and subtracted from, without departing from the scope of the invention. Thus, during the lowering of the pipes 2 and 3, the obturators may be linked by a cable and/or temporary retaining means 119 added to each obturator 103 in the portion 113. Alternatively, an obturator with inflatable walls used, as shown partly in dashed outline at 114, may be used possibly avoiding the need for any other retaining means. Deflating the wall 114, under the control of an electromagnetic valve 115 and a circuit 116 enables the method described to be used.

In fact, the chamber 120 could be inflated at the surface by means of an electromagnetic valve similar to valve 106, with a pipe 118, similar to pipe 105, which allows oil under pressure to be injected into the chamber 120 from the reservoir 104. The pipe, which is filled with air at 112 and with water at 113, is lowered for introduction into the opening in the receptacle 14, as has been explained. After lowering the intervention unit 23 and establishing atmospheric pressure in the enclosure, the electromagnetic valve 100 is operated to equalise the pressure on either side of the obturator 103. It is then possible to deflate the wall 114 by operating the electromagnetic valve 115 to provide communication between the chamber 120 and the portion 112 of the conduit through the pipe 117. The lip seal 102 is controlled as has already been explained and the obturator is removed for welding of the sleeve 88 to be carried out.

Figure 17:
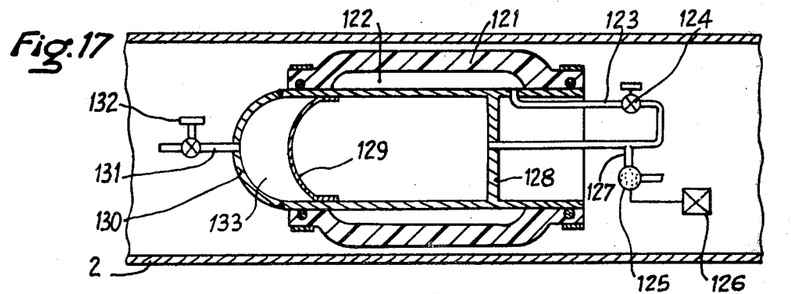
FIG. 17 is a schematic view of another form of obturator inserted in a pipe.

Finally, if the obturator is difficult to handle, it can be made to travel in the conduits after they are joined. In this case, to the electromagnetic valve 115 shown in FIG. 16 there may be added a unit able to pick up a signal passing through the walls of the pipes 2 and 3. So as not to overload the Figure, a modified form of the obturator 103 is shown in FIG. 17. The casing 130 contains a diaphragm 129 which separates a reserve of compressed air 133 from oil contained in the chamber between the diaphragm and the wall 128. This chamber communicates through a valve 124 and a pipe 123 with a chamber 122 defined between a deformable wall 121 and the casing 130. A receiver 126 for picking up signals transmitted through the wall of the pipe 2 controls a device 125 for depressurizing the oil, this device being connected to the pipe 123 through a pipe 127. Thus when the chamber 133 is inflated by means of a valve 132 and a pipe 131, and when the valve 124 is closed, the inflation chamber 122 is empty and permits the obturator to be inserted in the conduit. After it is positioned, the valve 124 is opened to inflate the deformable wall 121 and apply it against the wall of the pipe 2. The pipe can then be lowered and its end introduced into the receptacle 14. After the joining operation, the obturator is withdrawn by raising the pressure in one pipe and by operating the depressurizing device 125. The receiver 126 may be a conventional device which responds, for example, to an increase in pressure to operate the device 125. It is evident that receiver 126 could alternatively be controlled by any kind of coded signal, and that the device 125 itself may be of any type. For example, the receiver 126 could set off a pyrotechnic device to perforate a membrane closing off the device 125 or operating an electromagnetic valve which frees the fluid under pressure. Once the wall 121 is no longer applied against the pipe wall, the obturator can be moved therealong to recover it by simply raising the pressure on one side. This increase in pressure could first trigger the receiver 126, as shown above, the receiver comprising a monostat adjusted to operate the depressurizing device 125. This type of obturator is thus just as suitable for use with conduits filled with air at atmospheric pressure as with conduits filled with air under pressure or with water.

It will be appreciated that the receptacle 14, representing only a small part of the total cost of the operation, is left on the sea bed surrounding the joined ends of the pipes at the end of the joining operation.

What is claimed is:

1. A method of joining together the ends of two submerged pipes by welding in a gaseous atmosphere, comprising:

isolating said ends of said pipes to be joined by means of obturators placed in each of said pipe ends, said obturators isolating the interiors of the pipes from the exteriors of the pipes and including an externally controllable piston rod/cylinder assembly;

introducing said pipe ends into a receptacle;

closing said receptacle by means of an intervention unit;

filing said closed receptacle with gas;

selectively bearing the ends of said piston rods of each obturator on one another; and welding the thus isolated ends of said pipes to a sleeve of the same diameter as said pipes.

2. A method as claimed in claim 1, wherein said receptacle is provided with two opposed orifices each of which is surrounded by a controllable external sealing means, said method further comprising: operating said external sealing means after insertion of said pipe ends to seal said orifices, and cutting off sections of the ends of said pipes so that the distance between the pipe ends after cutting and insertion into said receptacle corresponds to the length of said sleeve.

3. A method of joining together the ends of two submerged pipes by welding in a gaseous atmosphere comprising:

isolating the ends of said pipes to be joined by means of obturators placed in each of said pipe ends, said obturators isolating the interiors of the pipes from the exteriors of the pipes; introducing said pipe ends into a receptacle provided with two opposed orifices each of which is surrounded by a controllable external sealing means;

closing said receptacle by means of an intervention unit;

operating said external sealing means after insertion of said pipe ends to seal said orifices;

filling said closed receptacle with gas;

cutting off sections of the ends of the pipes so that the distance between the pipe ends after cutting corresponds to a predetermined distance; and welding the isolated ends of the pipes to a sleeve having a diameter equal to the pipe diameter and having a length equal to said predetermined length, while a first portion of said obturators are maintained spaced apart from each other by a second portion of said obturators.

4. A method as claimed in claim 1 or 3, further comprising: placing said obturators in the ends of said pipes at the surface.

5. A method as claimed in claim 1 or 3, further comprising: placing said obturators in the ends of said pipes when said pipes are submerged.

6. A method as claimed in claim 1 or 3, further comprising: operating means for retaining said obturators before said sleeve is introduced between the ends of said pipes.

7. A method as claimed in claim 5, further comprising: introducing said sleeve between the ends of said conduits while said obturators are maintained spaced apart.

8. A method as claimed in claim 1, further comprising: welding said sleeve to said pipe ends while said cylinder assembly of said obturators are maintained spaced apart by said piston rod assembly of said obturators.

9. A method as claimed in claim 5, further comprising: centering said obturators relative to said receptacle by depressurizing said receptacle.

10. A method as claimed in claim 3, wherein each obturator includes a piston rod/cylinder assembly which can be controlled from said intervention unit, said method further comprising: selectively bearing the ends of said piston rods of said assemblies on one another.

11. A method as claimed in claim 10, including retracting said piston rods of said cylinders for the passage of the lower part of said sleeve on to the axis of said pipes, after at least one boom has been inserted between said obturators.

12. A method as claimed in claim 11, including advancing said piston rods of the said cylinders into abutment after passage of said lower part of said sleeve on to the axis of said pipes and removing all said booms before welding.

13. A method as claimed in claim 1 or 3, including operating said obturators after welding to free said obturators from said pipes, and increasing the pressure in one of said pipes to remove said obturators from said pipes.

14. A method as claimed in claim 4, including equalising the pressure in said pipes on either side of said obturators after removal of water contained in the enclosure formed by said receptacle and said intervention unit.

15. A method as claimed in claim 14, including operating said obturators to free them from said pipes and extracting said obturators from said pipes before welding.

16. A method as claimed in claim 14, including abutting said sleeve to the ends of said pipes and, after welding, operating said obturators to free them from said pipes and increasing the pressure in one of said pipes.

17. A method as claimed in claim 1 or 3, further comprising: introducing said obturators into said pipes on the surface and temporarily retaining said obturators therein by application of an inflatable membrane against the wall on each pipe, and freeing said obturators from said pipes after welding by telecontrol through the wall of said pipes or by raising the pressure inside one of said pipes.

* * * * *